United States Patent [19]

Shibano

[11] Patent Number: 4,896,161
[45] Date of Patent: Jan. 23, 1990

[54] ROADSIDE BEACON SYSTEM
[75] Inventor: Yoshizo Shibano, Osaka, Japan
[73] Assignee: Sumitomo Electric Industries, Ltd., Osaka, Japan
[21] Appl. No.: 63,383
[22] Filed: Jun. 18, 1987
[30] Foreign Application Priority Data Jun. 18, 1986 [JP] Japan ................... 61-141793

[51] Int. Cl.⁴ .......................... G01S 3/02; G01S 1/08; G08G 1/12
[52] U.S. Cl. .................................. 342/457; 342/386; 340/988
[58] Field of Search ............... 342/457, 450, 454, 456, 342/463, 464, 465, 386; 364/449, 424, 454; 340/988

[56] References Cited

U.S. PATENT DOCUMENTS 4,251,797 2/1981 Bragas et al. .................. 340/825.54
4,357,593 11/1982 von Tomkewitsch .............. 340/988
4,533,871 8/1985 Boetzkes ...................... 340/825.54

FOREIGN PATENT DOCUMENTS 0193377 11/1984 Japan ................................. 342/457

Primary Examiner—Thomas H. Tarcza
Assistant Examiner—Gregory C. Issing
Attorney, Agent, or Firm—Sughrue, Mion, Zinn, Macpeak & Seas

[57] ABSTRACT

A navigator system for providing in a moving vehicle a display of the position of the vehicle on a map. This position is recalibrated by a roadside antenna that transmits a split beam so that the signal is a minimum directly in front of the antenna. The on-board navigator recalibrates the position from data transmitted immediately before when the received signal is abruptly decreased as the vehicle passes directly in front of the antenna.

5 Claims, 5 Drawing Sheets

ROADSIDE BEACON SYSTEM

BACKGROUND OF THE INVENTION

1. Field of the Invention

This invention relates in general to roadside beacon systems, and more particularly to a novel roadside beacon system which is used for data transmission between a vehicle and road side antenna (beacon). The invention is also related to vehicle position calibration in a navigation system in which, after position data on a departure point are initialized, at least vehicle speed data and direction data are sensed, and the vehicle's position is calculated by using the data in order that the present position of the vehicle can be displayed.

2. Background of the Invention

A so-called "navigation system" has been proposed in the art in which a small computer and a display unit are installed on a vehicle. In such a navigation system, for example, road map data are read out of a memory device comprising a compact disc and so forth and a reproduction of a road map can thus be displayed on a display unit. Vehicle speed and moving direction are detected by a vehicle speed sensor and a direction sensor, respectively, in order to determine the current position and travel direction of the vehicle. According to these data thus determined, a symbol representing the vehicle is marked at the applicable position on the road map displayed on the display unit.

The use of the navigation system permits the operator of the vehicle to visually detect the current position and travelling direction of the vehicle so that he can drive the vehicle directly to the destination without losing his way.

However, such a kind of navigation system is disadvantageous in the following points. In the navigation system, errors inherent in the vehicle speed sensor and the direction sensor are accumulated as the vehicle travels without error corrections. When the vehicle has traveled for a certain distance, the vehicle position displayed on the display unit becomes much different from the true position of the vehicle. That is, the system does not work satisfactorily, and accordingly the operator may lose his way. It should be noted that the degree of error per unit is distance traveled may vary considerably from application to application, as the degree of error inherent in the vehicle speed sensor and direction sensor may fluctuate over time due to variations of the ambient conditions of these sensors.

In order to overcome the above-described difficulty, a so-called "roadside beacon system" has been employed. In the roadside beacon system, roadside antennas are installed alongside road networks at intervals of less than the distance with which the above-described accumulation of errors reaches a certain value. Each of the antennas thus installed is used to transmit a signal covering only a small area of the road. A signal which contains position data of the antenna or the place of correction, is thus transmitted and is received through a mobile antenna installed on the vehicle. Signal data is processed by a computer so that the position and travelling direction of the vehicle are calibrated according to the signal thus received.

With the roadside beacon system, the position and travelling direction of the vehicle can be displayed accurately with the accumulation of errors maintained less than a predetermined value, and as a result the navigation system works satisfactorily. Furthermore, the roadside beacon system is advantageous in that, if the roadside antennas are installed at positions near railways or railway crossings where the direction sensor is liable to operate with error because of strong magnetic fields caused by the railways, then errors attributed to external factors can be effectively corrected.

In the above-described roadside beacon system, a signal including the position data and road direction data is transmitted from each of the roadside antennas which have considerably high directivity. Therefore, the vehicle receives the signal only when passing through the area covered by the signal so that the necessary calibration is carried out according to the signal thus received. If the area covered by a signal is made larger in order to enable vehicles to receive more sufficient data, then the peak of the field strength of the radio wave transmitted from the roadside antenna is reduced as much, and it becomes difficult to detect the position correctly where the vehicle confronts the roadside antenna. That is, the conventional roadside beacon system suffers from drawbacks that when a data communication region is broadened, the signal receiving position with respect to the roadside antenna may be shifted so much that the satisfactory calibration effect cannot be obtained.

The fundamental function of the roadside beacon system is to transmit the signal including the position data and the road direction data to the vehicle having the navigation system. However, in order to improve the utility of the roadside beacon system, it is also desirable for the system to provide additional data or indicated function as follow:

(1) Traffic data on traffic congestion, construction work and other road use conditions around each of the roadside antennas are additionally applied to assist drivers in driving smoothly;

(2) Detailed map data including houses (with names) around the roadside antennas are added so as to facilitate the arrival of the vehicle at a desired destination;

(3) A relatively wide range of road map data including the areas where the roadside antennas are installed are additionally given to the navigation system to renew the road map on the display unit, thereby to allow the vehicle to smoothly travel to a far destination; and (4) Devices for bi-directional communications between vehicles and the roadside antenna system are required so as to carry out stable burst data communications.

For this purpose, it is essential to widen the bandwidth of the signal radiated from the roadside antennas, and to broaden the area covered by the signal. However, the widening of the bandwidth of the signal and the broadening of the area covered by the signal causes another difficulty in that a vehicle position detected with respect to the position of the roadside antenna may be greatly deviated. As a result the calibration of the vehicle position, which is the original object of the system, thereby becomes erroneous, being affected by the deviation of the detected position.

SUMMARY OF THE INVENTION

In view of the foregoing, an object of this invention is to provide a roadside beacon system in which a variety of functions can be readily performed while providing a broad communication region, and the position of the vehicle can nonetheless be calibrated with a high degree of accuracy.

The foregoing object of the invention has been achieved by the provision of a roadside beacon system using a split beam roadside antenna whose radiation pattern is such that a field strength is abruptly lowered in front of the antenna. A navigator device installed on a vehicle receives signals from the roadside antenna to calibrate vehicle position and to display the vehicle position thus calibrated. The navigator device comprises position determining means for detecting when a field strength becomes lower than a predetermined level and outputs a position detection signal. Calibrating means calibrate at least position data according to the position detection signal and data received.

The position determining means may be made up of region identifying means for detecting whether or not the vehicle is in the data transmission area of the roadside antenna and field strength discriminating means for determining whether or not a field strength is at a predetermined level or less.

Furthermore, the position determining means may comprise level decision means for outputting a level decision signal whenever the field strength exceeds a predetermined level and a flip-flop circuit for receiving the level decision signal from the level decision means. The field strength discriminating means may comprise a gate circuit which is opened by the output signal of the flip-flop circuit and strength decrease detecting means for detecting an abrupt decrease in the strength of a signal received through the gate circuit.

Moreover, the above-described region identifying means may comprise level decision means for outputting a level decision signal whenever the field strength exceeds a predetermined level, a gate circuit which is opened by the output signal of the level decision means, and a hold circuit for receiving the output signal of the gate circuit, to maintain the gate circuit open. The field strength discriminating means may be made up of strength decrease detecting means for detecting an abrupt decrease in strength of a signal received through the gate circuit, and data decision means for determining that data transmitted before and after the abrupt decrease in strength thereof coincide with each other or no data transmission is carried out. The data decision means outputs, on coincidence of the transmission data, a signal representing the fact that the abrupt decrease of signal strength occurs just in front of the roadside antenna. Thereafter, it outputs a signal for resetting the hold circuit.

In the roadside beacon system thus organized, the roadside antennas or split beam antennas, installed at preselected positions in a network of roads, transmit various data including at least position data to a vehicle.

The navigator device installed on the vehicle receives the data radiated from the roadside antenna and uses some of this data (namely position data) to thereby calibrate the vehicle position and to display it. In the navigator device, the position determining means detects when the field strength becomes lower than a predetermined level, i.e., when the vehicle passes in front of the roadside antenna, and outputs the position detection signal. Therefore, the calibrating means can calibrate at least the position of the vehicle according to the position detection signal and the data received.

Since the split beam antennas are installed along the roads, the field strength is abruptly decreased in front of the antennas. The navigator device detects this abrupt decrease point of the field strength, to determine the position of the vehicle with a high degree of accuracy.

The position determining means may comprise both the region identifying means for detecting whether or not the vehicle is in the data transmission region of the roadside antenna, and the field strength discriminating means for determining whether or not the field strength is at a predetermined level or less. In this case, the area identifying means can determine whether the vehicle is outside of the communication region of the roadside antenna or inside thereof. Therefore, the field strength discriminating means can detect the abrupt decrease of the field strength when the vehicle passes in front of the roadside antenna, to thus determine the position of the vehicle.

In one case, a region identifying means comprises the level decision means for outputting the level decision signal whenever the field strength exceeds the predetermined level, and a flip-flop circuit for receiving the level decision signal from the level decision means. Also, in this case, the field strength discriminating means comprises the gate circuit which is opened by the output signal of the flip-flop circuit, and the strength decrease detecting means for detecting the abrupt decrease in strength of the signal received through the gate circuit. As a result, in this case, as the vehicle approaches the roadside antenna, the level decision means outputs the level decision signal indicating that the field strength exceeds the predetermined level, to set the flip-flop circuit to open the gate circuit so that the signal received is supplied to the strength decrease detecting means. Therefore, the vehicle position can be detected by detecting the abrupt decrease of the field strength. When the field strength is increased thereafter, the flip-flop circuit is reset by the decision signal produced by the level decision means, so that the gate circuit is closed to suspend the supply of the signal to the strength decrease detecting means.

In a further case as described above, the region identifying means comprises level decision means for outputting the level decision signal whenever the field strength exceeds a predetermined level, the gate circuit which is opened by the output signal of the level decision circuit, and a hold circuit for receiving the output signal of the gate circuit to maintain the gate circuit open. Also, in this further case, as was described above, the field strength discriminating means comprises strength decrease detecting means for detecting the abrupt decrease in the strength of the signal received through the gate circuit, and data decision means for determining whether both data received before and after the abrupt decrease in the signal strength coincide with each other or no data transmission is carried out. The data decision means outputs a signal on the coincidence of the transmission data, which indicates the fact that the signal strength abrupt decrease occurs just before the roadside antenna and thereafter outputs the signal for resetting the hold circuit. Therefore, in this further case, when the level decision means determines that the field strength has exceeded a predetermined level, the gate circuit is opened to receive the data, and thereafter the hold circuit operates to maintain the gate circuit open so that the transmission data are supplied to the strength decrease detecting means. Then, the data decision means determines whether or not the transmission data provided before and after the signal strength decrease coincide with each other. When it is determined that the transmission data coincide with each other, a signal is outputted which represents the fact that the signal strength decrease point corresponds to the position of the roadside antenna. Thereafter, a signal to reset the hold circuit is outputted to reset the hold circuit so that the system is placed in an initial state again.

DETAILED DESCRIPTION OF THE PREFERRED EMBODIMENTS

Preferred embodiments of this invention will be described with reference to the accompanying drawings.

Figure 1:
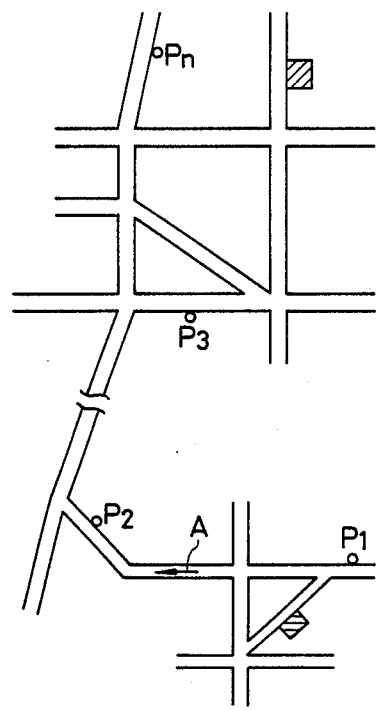
FIG. 1 is a diagram outlining an example of a road map displayed on a display unit in a roadside beacon system.

FIG. 1 is a diagram outlining one example of a road map displayed on a display unit. In FIG. 1, the present position and travelling direction of a vehicle are indicated by the arrow A, and roadside antennas $P_l$, $P_2$, ... and $P_n$ are indicated at various positions where they have been installed. The roadside antennas $P_l$ through $P_n$ may be omitted from the displayed map. Further in the road map of FIG. 7, large structures such as buildings are marked as landmarks.

Figure 2:
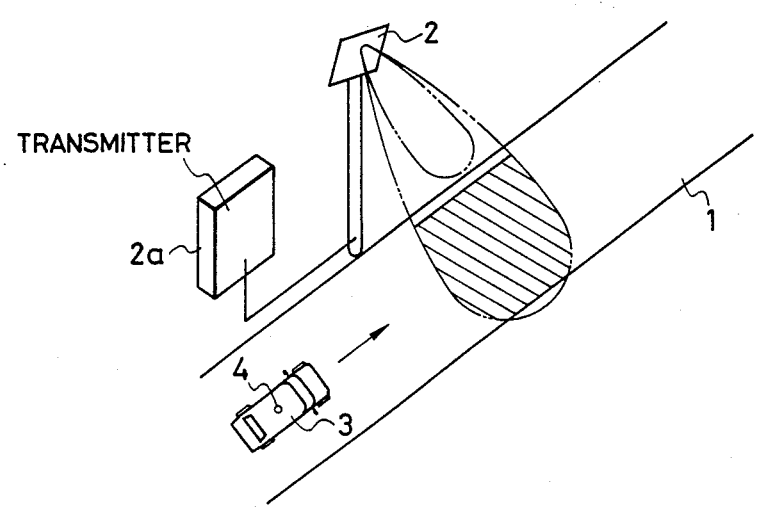
FIG. 2 is a perspective view outlining the roadside beacon system
Figure 3:
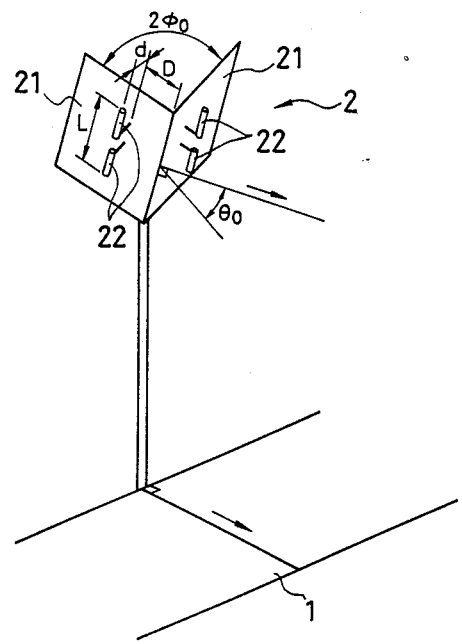
FIG. 3 is a perspective view showing the construction of a roadside antenna in the roadside beacon system.

FIG. 2 is an explanatory diagram for a description of a roadside beacon system. As shown in FIG. 2, a transmitter 2a supplies a signal including position data and road direction data to a roadside antenna 2. The roadside antenna is installed near a road 1 and radiates this signal in the vicinity of the road 1. A mobile antenna 4 for receiving the prescribed signal is installed at a predetermined position on a vehicle 3 which is traveling along the road 1. The signal received is supplied to a navigation device (not shown). The roadside antenna 2, as shown in FIG. 3, comprises two reflection panels 21 which form an angle of $2\phi_0$ and is bend downward at an angle of $\phi_0$. A dipole antenna 22 is installed at a predesignated position on each of the reflection panels 21. The dipole antennas 22 are excited in opposite phase.

Figure 4A:
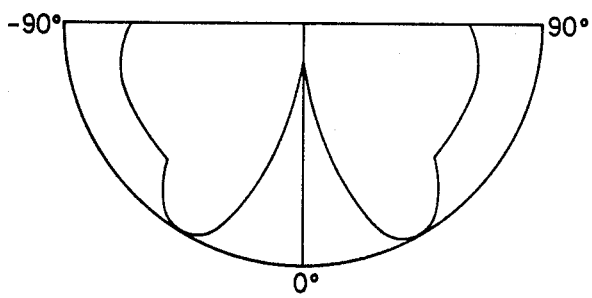
FIGS. 4A and 4B are diagrams showing the directivity of the roadside antenna.
Figure 4B:
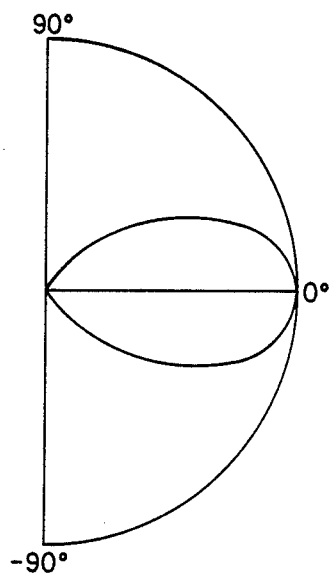

The installation and directivity of the dipole antennas 22 will be described in more detail. Assuming that $2\phi_0 < 90°$, that the distance d between each dipole antenna 22 and the reflection board 21 is 50 mm (d=50 mm), that the distance D between each dipole antenna 22 and the connecting line of the two reflection boards 21 is 100 mm (D=100 mm), that the length L of each dipole antenna 22 is 120 mm (L=120 mm), and that the signal frequency f is 1.5 GHz, the horizontal directional pattern of the antenna arrangement is as shown in FIG. 4A. That is, the electric field strength is extremely low or has a "zero point" at the central direction the electric field strength abruptly increases from the center position. As a result, there is a broad area of radiation as the field strength is high over a wide range of horizontal directions. Under the same conditions, the vertical or positional directional pattern is as indicated in FIG. 4B. That is, the positional directivity is considerably high.

The mobile antenna 4 is an antenna which is non-directional in the horizontal direction.

Figure 5:
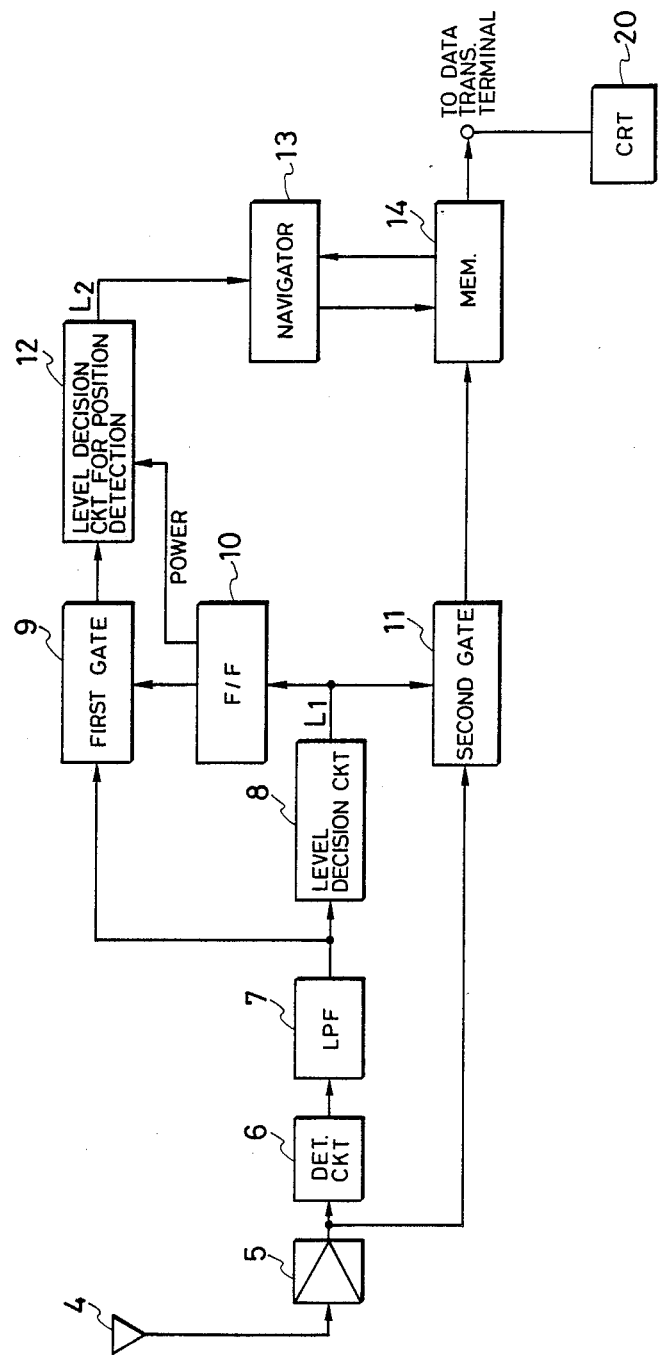
FIG. 5 is a block diagram showing a first example of a roadside beacon system according to this invention.

FIG. 5 is a block diagram showing one example of a roadside beacon system according to the invention. FIG. 5 will now be used for a description of the arrangement of a mobile signal receiver installed on a vehicle.

Figure 6:
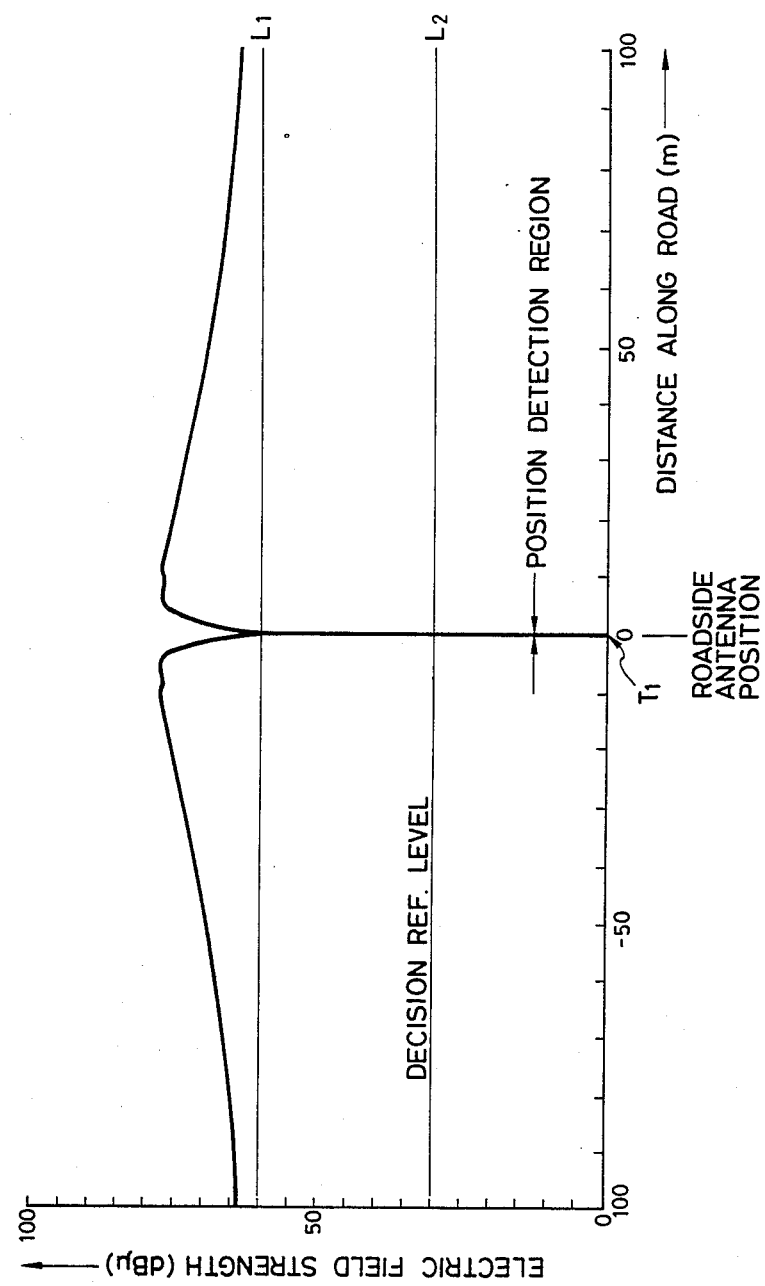
FIG. 6 is a graphical representation indicating an electric field strength distribution.

The signal (proportional to the field strength distribution indicated in FIG. 6) received by the mobile antenna 4 is amplified by an amplifier 5 and detected by a detector circuit 6. The output of the detector circuit 6 is applied to a low-pass filter 7, where high frequency components are removed so that a stable output is provided by the low-pass filter 7. The output of the filter 7 is supplied to both a level decision circuit 8 and a first gate circuit 9. A decision signal outputted by the level decision circuit 8 is applied to a flip-flop circuit 10 and a second gate circuit 11. The above-described first gate circuit 9 is opened by a signal outputted by the flip-flop circuit 10. The signal stabilized by the low-pass filter 7, i.e., the output signal of the low-pass filter 7 is supplied through the first gate circuit 9 to a position detecting level decision circuit 12. A decision signal outputted by the position detecting level decision circuit 12 is supplied, as a calibration control signal, to a navigator 13. The signal amplified by the amplifier 5 is supplied through the second gate circuit 11 to a memory 14. Data are transmitted between the memory 14 and the navigator 13. The memory 14 transmits data to a data transmission terminal which is connected to a CRT 20 for displaying a map such as that shown in FIG. 1.

In the level decision circuits 8 and 12 mentioned above, the decision reference levels are set to L1 and L2, respectively. The flip-flop circuit 10 serves as a power source for the position detecting level decision circuit 12.

The signal radiated from the roadside antenna 2 is, for instance, phase-modulated with transmission data, and has a horizontal directional pattern as shown in FIG. 4A.

The signal described above is received by the mobile antenna 4 and is amplified by the amplifier 5. It is then supplied to the detector circuit 6 and the second gate circuit 11. The signal detected by the detector circuit 6, after being stabilized by the low-pass filter 7, is supplied to the level decision circuit 8, where it is determined whether or not the level of the signal is higher than the reference level L1. When the signal level is higher than the reference level L1, the level decision circuit 8 outputs a high level signal, so that the second gate circuit 11 is opened to store the amplified signal in the memory 14.

In the case where the vehicle 3 traveling along the road 1 is significantly far from the roadside antenna 2, initially the level of the signal received by the mobile antenna 4 is substantially zero. That is, the level of the signal proportional to the average field distribution function is substantially zero. Therefore, a signal whose level is lower than the reference level L1 is applied to the level decision circuit 8. Therefore, a low level signal is provided by the flip-flop circuit 10, as a result of which the first gate circuit 9 is held closed, and no data transmission to the level decision circuit 12 is carried out.

As the vehicle approaches the roadside antenna 2, the level of the signal proportional to the average field distribution function increases gradually. When the level of the signal becomes higher than the reference level L1, the flip-flop circuit 10 outputs a high level signal, so that the first gate circuit 9 is opened. Thus, the signal stabilized by the low-pass filter 7 is supplied to the position detecting level decision circuit 12.

In the above-described operation, when no data is transmitted to the navigator 13 through the memory 14, the navigator 13 calculates and determines the present position and travel direction of the vehicle according to the vehicle speed data outputted by a vehicle speed sensor (not shown), the travelling direction data provided by a direction sensor (not shown), and a previous calibration. The present position and travelling direction thus determined together with the road map are displayed on the display unit (not shown). However, when the signal level becomes higher than the reference level L1, the second gate circuit 11 is opened, so that the signal amplified by the amplifier 5 can be stored in the memory 14.

When the vehicle reaches the roadside antenna 2 (i.e. when the vehicle travels directly in front of the antenna), the level of the signal proportional to the average field distribution function decreases abruptly. When the level of the signal supplied to the position detecting level decision circuit 12 becomes lower than the decision reference level L2, the level decision signal outputted by the level decision circuit 12 is supplied as a calibration control signal to the navigator 13 at the time instant $T_l$ in FIG. 6. Therefore, upon provision of the level decision signal, data stored in the memory 14 are supplied to the navigator 13, so that the present position is calibrated in the device. As a result, the position data and the travel direction data are calibrated, so that the correct present position and travelling direction are displayed on the display unit. In the above-described operation, the signal level becomes lower than the reference level L1 so that the level decision circuit 8 outputs the low level signal to close the second gate circuit 11. In this case, however, the state of the flip-flop circuit 10 is maintained unchanged and therefore the first gate circuit 9 is held opened to cause the position detecting level decision circuit 12 to perform a position detecting operation.

Thereafter, with the position and travelling direction thus calibrated as references, according to vehicle speed data from the vehicle speed sensor and travel direction data from the direction sensor the position and travel direction of the vehicle 3 together with the road map can be displayed with the arrow A on the display unit at all times.

After the vehicle 3 immediately passes by the roadside antenna 2, the signal level exceeds the reference level L1, and the level decision circuit 8 outputs the high level signal again. Therefore, the flip-flop circuit 10 is toggled to output the low level signal to close the first gate circuit 9. Accordingly, the position determining operation is not carried out at all until the vehicle approaches the following roadside antenna 2.

Whenever the vehicle passes through the area covered by the signal radiated from the roadside antenna 2, the level of the output signal of the level decision circuit 8 changes "low", "high", "low", "high" and "low" in the stated order. Therefore, the position data can be accurately calibrated by detecting the lowering of the signal level which is caused when the vehicle approaches the roadside antenna 2. As is apparent from FIG. 6 showing the field strength distribution along the road, the received signal level decreases abruptly. Therefore, the position detection can be achieved with considerably high accuracy even if the reference level L2 of the position detecting level decision circuit 12 varies more or less, or even if position detecting level decision circuit 12 is variable in characteristic due to manufacturing deviations. Furthermore, position detection is carried out by utilizing the abrupt decrease of the received signal level and according to the signal stabilized by the low-pass filter 7, as was described above. Therefore, if the decision reference level L2 is set to much lower than the value which may be reached during fading, then the position detection can be stably and accurately carried out substantially without being affected by multi-path transmission fading.

As is apparent from FIG. 6, the data transmission region is increased. That is, the data transmission region is more than about five times that in the case where a uni-directional antenna is used.

Figure 7:
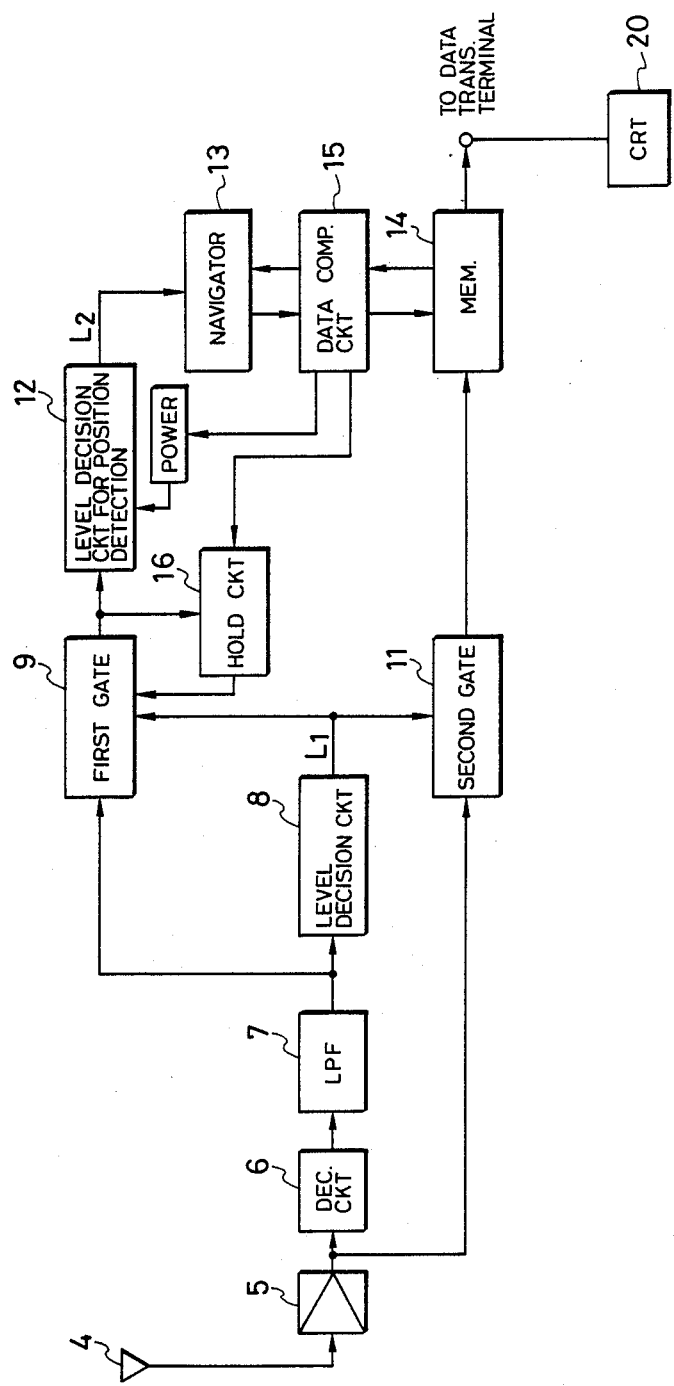
FIG. 7 is a block diagram showing a second example of the roadside beacon system according to the invention.

FIG. 7 is a block diagram showing a second example of the roadside beacon system according to the invention. FIG. 7 is different from the first example of FIG. 1 in the following points. The flip-flop circuit 10 is eliminated. Instead, a selfholding hold circuit 16 is connected to the first gate circuit 9 so that, once the first gate circuit 9 is opened, it is maintained opened. A data comparison circuit 15 is connected between the memory 14 and the navigator 13. The data comparison circuit 15 provides a signal representing the coincidence of data provided before and after the position detecting level decision circuit produces the output signal. The signal provided by the data comparison circuit 15 is applied, as a reset signal, to the hold circuit 16. As a result, the first gate circuit 9 is closed, and the supply of power to the position detecting level decision circuit 12 is interrupted. In these points, the circuit of FIG. 7 is different from that of FIG. 5. The data comparison circuit 15 is made up of a comparison circuit for comparing the contents of data provided before and after the position detecting level decision circuit 12 outputs the decision signal and a circuit for determining the presence or absence of data. As a result, when the vehicle 3 has passed through the data transmission region with the transmission of the data to be stored in the memory 14 suspended, the first gate circuit 9 and the second gate circuit 12 are reset.

The operation of the second example of the roadside beacon system thus organized will be described.

Similarly as in the first example shown in FIG. 5, when it is determined that the received signal level is higher than the reference level L1, the level decision circuit 8 outputs the high-level decision signal to open the first and second gate circuits 9 and 11 so that the signal stabilized by the low-pass filter 7 is supplied to the position detecting level decision circuit 12 while the signal amplified by the amplifier 5 is applied to the memory 14. The hold circuit 16 is set by the output signal of the first gate circuit 9, thus maintaining the first gate circuit 9 open. Supplying the signal to the position detecting level decision circuit 12 can be continued without being affected by the received signal level.

Data transmitted through the roadside antenna 2 is stored in the memory 14 several times. Therefore, when the received signal level becomes lower than the reference level L2 and the position detecting level decision circuit 12 outputs the position detection signal, the contents of data provided before and after the position detection signal is outputted are compared in the comparison circuit 15. Upon coincidence of the data, the data comparison circuit 15 applies the reset signal to the hold circuit 16 so that the output signal of the position detecting level decision circuit 12 is suspended. And when the level of the decision signal outputted by the level decision circuit 8 becomes low, the first gate circuit 9 is closed so that the position detecting operation is suspended. If, in this connection, the reference level L2 is set much lower than a value which may be reached during fading, then the position detecting operation can be stably and accurately achieved without being affected by fading.

When coincidence of data is confirmed by the comparison circuit, data which have been stored in the memory 14, are supplied from the memory 14 through the data comparison circuit 15 to the navigator 13, so that the present position stored in the device is calibrated. The position data and the travelling direction data are used to calibrate on the present position, so that the correct present position and travelling direction of the vehicle are displayed on the display unit.

In the case where non-coincidence of the data is confirmed by the comparison circuit 15, even if the position detecting level decision circuit 12 outputs the position detection signal, it is determined that the position detection signal thus outputted is not a correct one. That is, the hold circuit 16 is caused to keep outputting the high level signal. Therefore, the supply of the stored data into the navigator 13 from the memory 14 is suspended so that the incorrect calibration is positively prevented.

Whenever the vehicle passes by each roadside antenna 2, the above-described operations are repeated, so that the navigation of the vehicle is accurately achieved irrespective of the travel a distance.

While the preferred embodiments of the invention have been described, the invention is not limited thereto or thereby. For instance, in the above-described embodiments, the effect of the fading phenomenon is lessened by using the low-pass filter 7. However, if a amplitude-modulated signal with a sufficiently high frequency is transmitted from the roadside antenna and is demodulated in the mobile signal receiver, then the effect of the fading phenomenon can be eliminated from the received signal. Furthermore, if the mobile antenna is installed in such a manner as to tilt upward, then only the signal not effected by fading can be received. It will be obvious to those skilled in the art that various changes and modification may be made in the abovedescribed embodiments without departing from the invention.

As was described above, in the roadside beacon system of the invention, the split beam antennas are employed as the roadside antennas, and the position detecting operation is carried out by detecting the abrupt decrease of the receiving signal level. Therefore, the position detecting operation can be achieved accurately substantially without being affected by variation of the decision reference levels or variation in characteristic of the position detecting level decision means, and the amount of transmission data can be increased. Further, according to the present invention, wide data communication region can be also obtained.

What is claimed is:

1. A roadside beacon system for allowing vehicle navigation systems to be accurately calibrated to a current position, said roadside beacon system comprising: at least one roadside antenna means including a split beam antenna installed along a road, said roadside antenna means for emitting navigational data signals in the form of a radiation pattern across a road portion adjacent to said roadside antenna means, said antenna means having a directional pattern such that a field strength of signals radiated therefrom is abruptly lowered along a radiation pattern axis which intersects said road; and
navigation means installed on a vehicle, said navigation means including:
means for receiving said navigational data signals; and
position discriminating means for detecting when a field strength of received said navigational data signals becomes less than a first predetermined level and to thereupon output a position signal; and
calibrating means for calibrating said navigation means to a current position according to said position signal and position data included in said navigational data signals.

2. A roadside beacon system as recited in claim 1, wherein said position discriminating means comprises:
radiation pattern detecting means for detecting whether said vehicle is within said radiation pattern emitted across said road; and
field strength discriminating means for determining when said field strength of said received signal is below said first predetermined level.

3. A roadside beacon system as recited in claim 2:
wherein said radiation pattern detecting means comprises:
first level detecting means for outputting a detection signal when said field strength of received said navigational data signals exceeds a second predetermined level greater than said first predetermined level, and
a flip-flop circuit for receiving said detection signal from said first level detecting means; and
wherein said field strength discriminating means comprises:
a gate circuit which is opened by an output signal from said flip-flop circuit for selectively passing at least part of received said navigational data signals, and
second level detecting means for detecting when received said navigational data signals passed through said gate circuit falls below said first predetermined level.

4. A roadside beacon system as recited in claim 2:
wherein said radiation pattern detecting means comprises:
first level detecting means for outputting a detection signal when said field strength of received said navigational data signal exceeds a second predetermined level,
a gate circuit which is opened by an output signal from said first level detection means for selectively passing at least part of said received signal; and
wherein said field strength discriminating means comprises:
second level detecting means for detecting when a level of received said navigational data signals passed through said circuit falls below said first predetermined level and to thereupon output an interruption signal, data comparison means for determining whether data included in said navigational data signals received before and after said interruption signal coincide, and to thereupon output a coincidence signal, and means for resetting said gate circuit responsive to said coincidence signal.

5. A roadside beacon system as recited in claim 3, further comprising means for displaying a vehicle position and navigational information based on said navigational data signals.

* * * * *